Aug. 18, 1953    J. R. EVES    2,648,975
DEVICE FOR TESTING IMPACT RESISTANCE OF FRANGIBLE ARTICLES
Filed Nov. 30, 1948
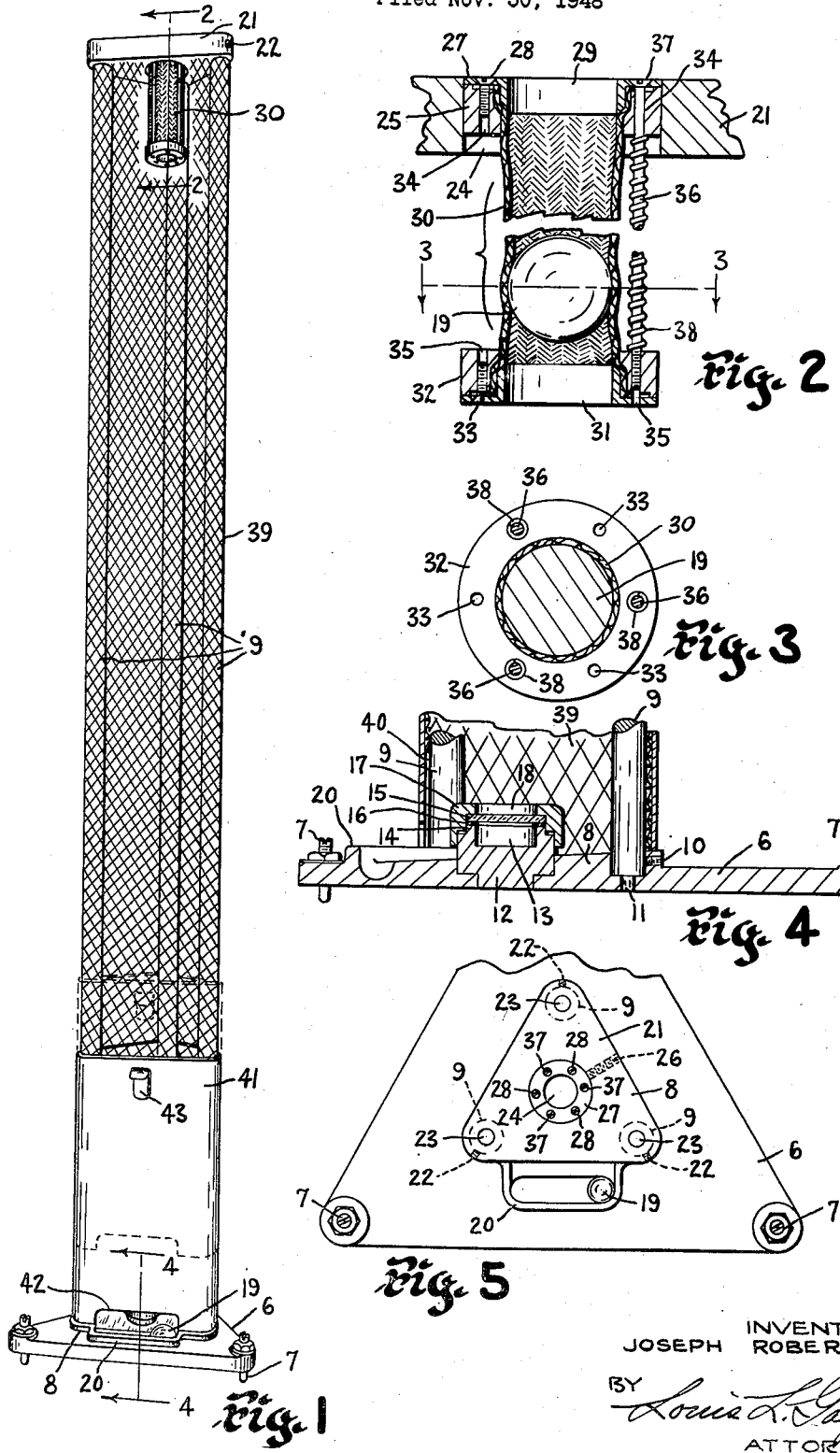
INVENTOR
JOSEPH ROBERT EVES
BY Louis L. Gagnon
ATTORNEY Patented Aug. 18, 1953

2,648,975

UNITED STATES PATENT OFFICE 2,648,975

DEVICE FOR TESTING IMPACT RESISTANCE OF FRANGIBLE ARTICLES

Joseph Robert Eves, Southbridge, Mass., assignor to American Optical Company, Southbridge, Mass., a voluntary association of Massachusetts Application November 30, 1948, Serial No. 62,729

7 Claims. (Cl. 73—12)

This invention relates to testing devices and has particular reference to devices used for testing the resistance of glass articles such as lenses to impact, and more particularly to the resistance of articles of this nature which have been treated by hardening to render them more resistant to such impact.

An important object of this invention is to provide a device for testing the resistance of glass articles to impact of an object dropped thereon and embodying means for controlling the force of the object and the path thereof as it falls onto the article, whereby said force and path may be consistent during similar repeated tests.

Another object of the invention is to provide a testing device embodying an upright support having means at its lower end for supporting a glass article such as a lens and having means at its upper end for controlling the release of an object to be dropped onto the lens.

Another object is to provide a device of the above character wherein the means for controlling the release of the object to be dropped onto the lens embodies a sleeve which can be adjusted to provide the desired tension upon the object to control the speed of the object at the point of release and also can be angled to direct the object so that it will, during repeated tests, continually contact a lens or lenses at the desired point on the surface thereof.

Another object is to provide a device of the above character embodying an upright support which is covered by mesh, a base on which said upright is mounted, said base having improved means for supporting a glass article such as a lens, and a cap suitably disposed upon the support and embodying means for controlling the release of an object to be dropped upon the article and for controlling the path of the object as it is dropped, the base having additional means associated therewith for angling the support so as to further control the path of the object as it is dropped onto the article.

Other objects and advantages of this invention will become apparent from the following description taken in connection with the accompanying drawing, in which:

Fig. 1 is as front elevational view of a device embodying the invention;

Fig. 2 is a fragmentary sectional view taken on line 2—2 of Fig. 1;

Fig. 3 is a sectional view taken on line 3—3 of Fig. 2;

Fig. 4 is a fragmentary sectional view taken on line 4—4 of Fig. 1; and

Fig. 5 is a fragmentary top plan view of the device illustrated in Fig. 1.

It is very important in the manufacture of many glass articles that the articles be able to withstand at least an established amount of impact or force applied thereagainst. This is particularly true in the manufacture of such glass articles as lenses which are used in goggles or other types of eye-protective equipment. Therefore, certain standards have been established wherein a lens should withstand the impact of an object of a controlled size and weight when dropped onto the lens from a specified distance.

Prior art devices used for testing the resistance of glass articles to such impact have generally been of an inefficient nature. Such devices have generally embodied a base having the article to be tested supported adjacent one end thereof and having a solid upright or stand carried at its opposite end, the stand having a cap at its upper end disposed substantially parallel to the base and having an opening therein above the article. In using such devices the operator merely inserts a ball or similar object in the opening, allowing it to fall in the general direction of the article. In such devices there is generally no means provided to control the release of the ball so the ball, therefore, can easily be dropped with varying amounts of force upon the article. In addition there is no way provided for repeatedly dropping a ball with assurance that it will repeatedly contact a specified area on the surface of the article since with such devices the ball may be easily deflected and will rarely repeatedly contact the same spot.

The present invention overcomes these objections by providing means for controlling the release of the ball as well as to control the path of the ball as it is dropped onto the article so that repeated tests can be made with the assurance that all pertinent conditions have been perfectly duplicated in each repeated test.

Referring more particularly to the drawing wherein like characters of reference designate like parts throughout the several views, the present invention embodies a base 6 which may be designed triangular so as to be easily adjusted or leveled by vertically adjustable studs or leveling screws 7 located in each corner thereof. The upper surface of the base 6 is provided with an inclined raised area 8 having vertically drilled openings in each corner in which are located the lower ends of vertically extending supporting rods 9 which are immovably held therein by means such as set screws 10 (Fig. 4). The rods 9 should fit snugly within the openings in the raised area 8 and so that they may be easily removed in dismantling the device there are provided "knock out" openings 11 communicating with said first openings from the lower surface of the base 6.

Suitably located in the raised area 8 of the base 6 substantially centrally thereof is a lens supporting block 12 the upper surface of which is raised above the surface of the raised area 8 and has a depressed area 13 formed therein so as to provide a substantially circular rim 14 on which a lens 15 is supported. A circular ring 16 of suitable resilient material such as natural rubber, plastic, synthetic rubber or the like is inserted between the lens 15 and the rim 14, the ring 16 being used to provide the necessary contact between the lens and the rim as required by standards controlling such devices. A cup-like retainer 17 is adapted to be placed over the lens and has its marginal portions shaped to fit about the block 12 to retain the lens in located position. The retainer 17 is provided with an opening 18 therethrough above the major portion of the lens 15, the inner marginal areas about the opening 18, however, abutting the upper surface of the lens.

In testing the resistance of a lens 15 supported by the block 12 a ball 19 of specific size, weight and material is adapted to be dropped onto the lens 15, and after contacting the lens the ball 19 will fall onto the surface of the inclined raised area 8 of the base 6 and roll into a trough 20 formed adjacent thereto on the base 6.

The upper ends of the supporting rods 9 are adapted to reside in openings formed in the lower surface of a cap member 21 carried thereby and to be held therein by means such as set screws 22, with "knock out" holes 23 being provided in the cap 21 communicating with the openings containing the ends of the rods 9 so that the rods may be easily removed. The cap 21 is provided with a central vertical opening 24 which is substantially vertically aligned with the opening 18 in the retainer 17 when the base is level. Thus a ball 19 in being dropped through the opening 24 should, if not deflected in any way, fall onto the lens 15.

However, it is undesirable to allow a user to insert a ball into dropping position by hand since the ball may be deflected from a true vertical path by rotation as it drops, which condition is difficult to overcome since a user may unknowingly and accidentally cause the ball to rotate when it leaves his hand. Also, during different tests it is difficult for the user to control the amount of force with which the ball drops. Thus there is little opportunity for all pertinent conditions to be consistent during repeated tests.

Therefore, means is provided for automatically controlling the release of a ball, the means embodying a ring member 25 (Fig. 2) which is located within the opening 24 of the cap 21 and held immovable therein by a set screw 26. A flat circular collar 27 shaped to reside on the upper surface of the member 25 and attached thereto by screws 28 is provided with a downwardly extending circular portion 29, over which portion 29 is fixedly located one end of an adjustable tubular member 30. The tubular member 30 is of a type commonly known as a "Japanese finger" and is made preferably of a fabric material which is woven so that when the member is caused to be extended lengthwise the diameter will be decreased. The present member 30 is preferably woven of glass fibers which are not influenced by changes in atmospheric conditions and thus the member will retain an adjusted position indefinitely.

The lower end of the member 30 is fixedly secured over a portion of a collar 31 similar to its connection to the collar 27, the collar 31 supporting a ring 32 which is mounted thereover and secured thereto by screws 33.

For changing the length of the tubular member 30 and adjusting the diameter so that the member will permit a ball 19 to travel downwardly therethrough with the desired amount of friction existing between the member and the ball, each of the rings 25 and 32 are provided with a plurality of concentric openings 34 and 35 respectively (Fig. 2). Some of the openings 35 in the ring 37 are threaded to receive the threaded end of headed adjusting studs 36, the headed ends of the studs 36 being freely rotatable in the upper ring 25 with the heads 37 thereof residing in countersunk openings in the adjacent collar 27 and provided with a slot to permit easy adjustment of the studs 36 by means such as a screwdriver. A coiled tension spring 38 is located over each stud 36 between the rings 25 and 32 and serves to maintain the rings in adjusted spaced relation.

By adjusting the length of the tubular member 30 it will be understood that due to the inherent characteristics of the member the diameter thereof will be simultaneously adjusted. Thus, the member can be adjusted so as to allow a ball 19 to be grasped with some degree of firmness around its entire circumference, with gravity acting to pull the ball downwardly through the member 30 until it reaches the collar 31, at which point the ball will be released from its engagement with the member 30, with the entire circumferential engaging area being freed at once so that the ball will be dropped without rotation and at a speed in accordance with the speed of travel of the ball through the member, which speed is controlled by the adjustment of the diameter of the tubular member 5.

To insure that the ball will not be deflected during its drop from the member 30 to the surface of the lens 15, the device can be provided with a covering 39 supported over the rods 9. Such a covering may be made of screen, expanded slotted metal, glass, or combination thereof, with an opening 40 (Fig. 4) being provided in its lower extremities to permit insertion of a lens on the block 12 or removal of a lens or pieces of broken glass therefrom.

To prevent the ball from bouncing through the opening 40, a vertically slidable cover 41 is provided over the covering 39, the cover 41 being provided with a cut out portion 42 adjacent the trough 20 to permit egress of the ball from the interior of the device after being dropped. Thus, by grasping the handle 43, the cover 41 can be lifted to expose the opening 40 in the covering 39 as shown in dotted outline in Fig. 1.

By leveling the device, through manipulation of the leveling screws 7 in the base 6, the path of the ball 19 can be controlled so that the ball will, upon being dropped, repeatedly engage the desired physical point on the surface of a lens supported by the block 12 with the tubular member 30 assuring that the ball will be released without sufficient rotation to influence the path of the ball as it is dropped. The force of the ball will, due to the adjustment of the diameter of the tubular member 30, remain constant for repeated tests as long as the adjustment is maintained. Therefore, with the present device, repeated tests can be made with the assurance that all pertinent conditions will be duplicated.

While certain novel features of the invention have been shown and described and are pointed out in the annexed claims, it will be apparent that various omissions, substitutions and changes in the formation and details of the device illustrated and in its use may be made by those skilled in the art without departing from the spirit of the invention.

I claim:

1. A device for testing the resistance of glass articles to impact of an object dropped thereon comprising a base having supporting means for carrying the article to be tested, an upright on said base, a flexible tube-like member carried by said upright and disposed above the article supporting means in sustantial vertical alignment therewith, and means operable on said flexible tube-like member to increase and restrict the size of the opening therethrough whereby release of said object when the object is placed in said opening in position to be dropped onto the article may be controlled.

2. A device for testing the resistance of glass articles to impact of an object dropped thereon comprising a base having supporting means for carrying the article to be tested, an upright on said base, a tube-like member carried by said upright and disposed above the article supporting means, said tube-like member having a cylindrically shaped opening therein in substantial vertical alignment with the article supporting means, said opening being variable in size of diameter and means associated with said tube-like member and operable to control the size of the diameter of said opening so as to frictionally engage the object as it passes therethrough in dropping onto the article to be tested.

3. A device for testing the resistance of glass articles to impact of an object dropped thereon comprising a base having supporting means for carrying the article to be tested, an upright on said base, a cap member carried by said upright and disposed above the article supporting means, said cap member having a vertical opening therein through which said object is to be dropped, the opening being in substantial vertical alignment with the article supporting means, and means connected to said cap member adjacent said opening for controlling the release of said object comprising a vertically disposed tubular member depending from the cap member with the said opening in the cap member communicating with the interior of the tubular member to permit passage of the object from the opening to the tubular member, the diameter of the tubufar member being variable in size, and means carried by the tubular member and operable to alter said diameter to a size where the object will be frictionally impeded as it passes therethrough in dropping onto the said article.

4. A device for testing the resistance of glass articles to impact of a substantially round object dropped thereon comprising a base having supporting means for carrying the article to be tested, an upright on said base, a cap member carried by said upright and disposed above the article supporting means, said cap member having a vertical opening therein through which said object is dropped, the opening being in substantial vertical alignment with the article supporting means, means connected to said cap member adjacent said opening for controlling the release of said object comprising a vertically disposed tubular member having one end attached to the said cap member with the opening in the cap member communicating with the interior of the tubular member to permit passage of the object from the opening into the tubular member, the walls of said tubular member being of a flexible nature to permit by adjusting the length of said tubular member a simultaneously adjustment of the diameter thereof and means for adjusting said length so as to cause said walls of the tubular member to engage the object with the desired amount of friction as it passes therethrough in dropping onto the article.

5. A device for testing the resistance of glass articles to impact of a substantially round object dropped thereon comprising a base having supporting means for carrying the article to be tested, an upright on said base, and a vertically disposed tubular member carried by said upright and disposed above the article supporting means for controlling the release of said object, said tubular member being disposed in substantial vertical alignment with the article supporting means, and fabricated of fibers arranged so that upon lengthening or shortening the member the diameter of the member will be simultaneously adjusted, and means for adjusting the length of said tubular member and simultaneously adjusting the diameter thereof so as to cause the walls of the tubular member to engage the object with the desired amount of friction as it passes therethrough in dropping onto the article comprising a collar located around each end of the tubular member and connected thereto and a plurality of longitudinally adjustable studs connecting the collars, the studs being rotatable to adjust the distance between the collars and consequently simultaneously adjust the length and diameter of the tubular member as desired.

6. A device for testing the resistance of glass articles to impact of a substantially round object dropped thereon comprising a base having supporting means carrying the article to be tested, a plurality of spaced uprights on said base surrounding said supporting means and forming a framework for carrying a cap member thereon, the cap member being disposed above the article supporting means having a vertical opening therein in substantial vertical alignment with the article carried by the supporting means, means connected to said cap member adjacent said opening for controlling the release of said object comprising a vertically disposed tubular member fabricated of fibers arranged so that upon lengthening or shortening the member the diameter of the member will be simultaneously adjusted, the tubular member being attached at its upper end to the cap member with the opening in the cap member communicating with the interior of the tubular member to permit passage of the object from the opening into the member, and means for adjusting the length of said tubular member and simultaneously adjusting the diameter thereof so as to cause the walls of the tubular member to engage the object with the desired amount of friction as it passes therethrough in dropping onto the article comprising a collar located around each end of the tubular member and connected thereto and a plurality of longitudinally adjustable studs connecting the collars, the studs being rotatable to adjust the distance between the collars and consequently simultaneously adjust the length and diameter of the tubular member as desired, an inclined runway formed in the surface of said base for causing said substantially round object after being dropped onto a lens to pass freely from the article supporting means to the exterior of the framework, a fixed covering positioned over said framework and having an opening in a lower portion thereof adjacent said runway for permitting entrance to said article supporting means, a vertically movable cover positioned over the lower portion of said framework and covering and having an opening in a lower portion thereof adjacent said inclined runway of a size to permit unhindered egress of the object from the interior of the covered framework when the cover is in lowermost position.

7. A device for testing the resistance of a frangible article to the impact of an object of controlled size and weight dropped thereon comprising means for supporting the article under test at a given location, and object release controlling means supported over said article supporting means, said object release controlling means having an opening for receiving the object to be dropped and embodying an adjustable member operable to increase and decrease the size of said opening, and means operating on said adjustable member to control the size of said opening whereby the fall of an object inserted in said opening for dropping onto the article under test may be controlled.

JOSEPH ROBERT EVES.

References Cited in the file of this patent

UNITED STATES PATENTS

| Number | Name | Date |
|---|---|---|
| 1,490,836 | Lipps | Apr. 15, 1924 |
| 1,709,638 | Thwing | Apr. 16, 1929 |
| 2,264,412 | Shindel | Dec. 2, 1941 |